(12) United States Patent
Zhao

(10) Patent No.: US 8,687,362 B2
(45) Date of Patent: Apr. 1, 2014

(54) PORTABLE BRIEFCASE OFFICE

(76) Inventor: Yifan Zhao, Fullerton, CA (US)

(*) Notice: Subject to any disclaimer, the term of this patent is extended or adjusted under 35 U.S.C. 154(b) by 213 days.

(21) Appl. No.: 13/461,782

(22) Filed: May 2, 2012

(65) Prior Publication Data

US 2013/0294021 A1 Nov. 7, 2013

(51) Int. Cl.
*G06F 1/16* (2006.01)

(52) U.S. Cl.
USPC ............ 361/679.55; 361/679.02; 361/679.23; 312/223.1; 312/223.2

(58) Field of Classification Search
USPC .................................................... 361/679.55
See application file for complete search history.

(56) References Cited

U.S. PATENT DOCUMENTS

| | | | | |
|---|---|---|---|---|
| 4,832,419 A * | 5/1989 | Mitchell et al. | ........... | 361/679.21 |
| 5,021,922 A * | 6/1991 | Davis et al. | ............. | 361/679.09 |
| 5,157,585 A * | 10/1992 | Myers | ...................... | 361/679.17 |
| 5,364,196 A * | 11/1994 | Baitz et al. | .................... | 400/691 |
| 5,483,250 A * | 1/1996 | Herrick | ........................... | 345/32 |
| 5,825,614 A * | 10/1998 | Kim | ......................... | 361/679.55 |
| 5,845,144 A * | 12/1998 | Tateyama et al. | ................. | 712/1 |
| 5,883,820 A * | 3/1999 | Ota et al. | ................. | 361/679.55 |
| 6,128,186 A * | 10/2000 | Feierbach | ................ | 361/679.27 |
| 6,219,229 B1 * | 4/2001 | Lee | .......................... | 361/679.08 |
| 6,442,018 B1 * | 8/2002 | Dinkin | ........................ | 206/305 |
| 6,480,374 B1 * | 11/2002 | Lee | .......................... | 361/679.17 |
| 6,781,823 B1 * | 8/2004 | Nyack | ...................... | 361/679.29 |
| 7,002,793 B2 * | 2/2006 | Imsand | ...................... | 361/679.04 |
| 8,134,831 B1 * | 3/2012 | Hernandez | ............... | 361/679.55 |
| 2009/0091885 A1 * | 4/2009 | Burford | ................... | 361/679.55 |

* cited by examiner

*Primary Examiner* — Anthony Q Edwards

(57) ABSTRACT

A portable briefcase office comprises of a computer unit, a storage unit, and a supplies and devices unit. It integrates a computer, printer, projector, storage space, battery, and other office supplies in one easily transported briefcase. It is not a case for devices, but a compact apparatus that incorporates these devices as it would appear in an entire office.

13 Claims, 8 Drawing Sheets

PORTABLE BRIEFCASE OFFICE

CROSS-REFERENCE TO RELATED APPLICATION(S)

None.

BACKGROUND

Employees of business, outdoor service and research science often go out of office to perform a various of necessary business or service tasks for their occupation. Most of the time, these people need many office supplies and devices to complete tasks with their customers. However, it is virtually impossible to carry every office supply to their site of work, causing difficulties in presenting documentation, performing services and signing contracts. For instance, if the businessman stated above successfully negotiated a deal with their customers and needs the customers to sign a contract, they may only find the contract in their computer, and not in paper format for the customer to sign. Assuming the employee was intelligent enough to have copies of the contract for customers to sign beforehand, the employee will often need to make copies of the document in paper or electronic format for documentation, needing a computer, printer, scanner, and other office supplies to complete the process. In likely situations, the employee will not bring enough devices with them to the job site, creating possible delaying or losing of their business; similar problems may occur for service people in customer services and scientists in scientific presentations. This problem is extremely common, causing thousands of people in the world to experience possible obstructions in task completion.

To solve the problem, many inventors attempted to create several methods of containing office device and supplies in one portable unit. U.S. Pat. No. 5,242,056 by Farrukh Zia et al. designed a briefcase to store common office supplies in a suitable arrangement to fit a case, creating ease of access and transportation. This patent, however, is only a case for existing office supplies with minimal features that may not satisfy their needs, and when in use, it is virtually impossible to place all necessary office supplies in the case, due to limitations of size and shape. Devices such as printer, scanner, computer, copy machine, and other supplies cannot possibly be placed in this briefcase. U.S. Pat. No. 7,278,644 by Villareal is a design of a portable workspace for easy transportation. Although it claims to be portable due to the wheels on bottom, it is not at all feasible to have a worker carry an entire desk around on a daily basis for services outside of office, as it is too bulky. As to my knowledge, there are no convenient portable devices powerful enough to fit all necessary equipment used to match their needs. It is imperative to create a practical portable apparatus to fulfill this market demand. Recent patent application US2011/0043579 by Leppanen integrates a laptop computer and printer into one unit. This invention improves productivity in the occupations stated above to a certain degree, nevertheless, it is inconvenient to operate the keyboard because the keyboard is attached to the screen and located on top of the printer. And also, it cannot satisfy the needs for other office supplies other than a laptop computer and printer.

Up to now, there are no realistically suitable methods to solve the problem of importability of all necessary office supplies and devices. As technology improves in smaller size, it is now possible to realize a practical moveable office in one case.

SUMMARY OF THE INVENTION

Aspects of the present invention relate to a portable briefcase office containing a computer unit, a storage unit, and an office supplies and devices unit. In one embodiment, the computer unit is located at one side of the briefcase, and it integrates a compact laptop computer control board, a display screen, a removable keyboard, a camera, a pair of speakers, and a microphone. Unlike normal laptop computers, the display screen in this invention is facing outside of the computer unit. It is attached at the top edge of the briefcase and is angle adjustable; it is adjusted by pulling out from the bottom edge of the screen to a fit view for convenient operation. The compact laptop computer control board is at one side facet of the briefcase behind the display screen. The removable keyboard with an included trackpad is stored behind the display screen in a slot next to the laptop control board. In normal computer operation, the keyboard is taken out from the slot and placed in front of the screen, and controls the computer, printer, scanner, copy machine, and all other electronic devices integrated in the portable briefcase office, wirelessly or wired. The storage unit of the portable briefcase office is placed behind the computer unit with a lockable lid. The storage unit can be used to store necessary office documents and other small office supplies. The office supplies and devices unit of the portable briefcase office, on the bottom of the briefcase, contains a compressed retractable printer with additional features of scanner, copy and fax machines, assembled at one side below the computer and the storage unit, an optical drive located to the other side of the printer, a compact projector included next to the optical drive, an internal rechargeable battery powering all electronic devices, and finally, a hole puncher and stapler unit placed on top of the printer, optical drive, and projector. That is to say, this unit integrates all these specifically designed devices portably in one unit. The portable briefcase office in this invention, is not a case for these devices, but a compact apparatus that will function just as an entire office containing these separate devices and supplies for the task. The portable office briefcase can be made into different models and series; components within the units are all or partially selected depending on its necessity of various occupations.

BRIEF DESCRIPTION OF THE DRAWINGS

In the drawing which illustrate the preferred embodiments and the best modes presently contemplated for carrying out the present invention.

Corresponding reference numerals indicate corresponding parts throughout several views of the drawings.

DETAIL DESCRIPTION OF THE PREFERRED EMBODIMENTS

With reference to the figures where like components have been given like numerical designations to facilitate the reader's understanding of the present invention, and specifically to the embodiments of the portable office shown in the present invention in the illustration, various preferred embodiments of the present invention are set forth below. Though particular components, materials, uses, and configurations of the portable office are illustrated and set forth in this disclosure, it must be understood that variations to the components, materials, uses, and configurations can be made without altering the scope and function of the invention set forth herein.

Figure 1:
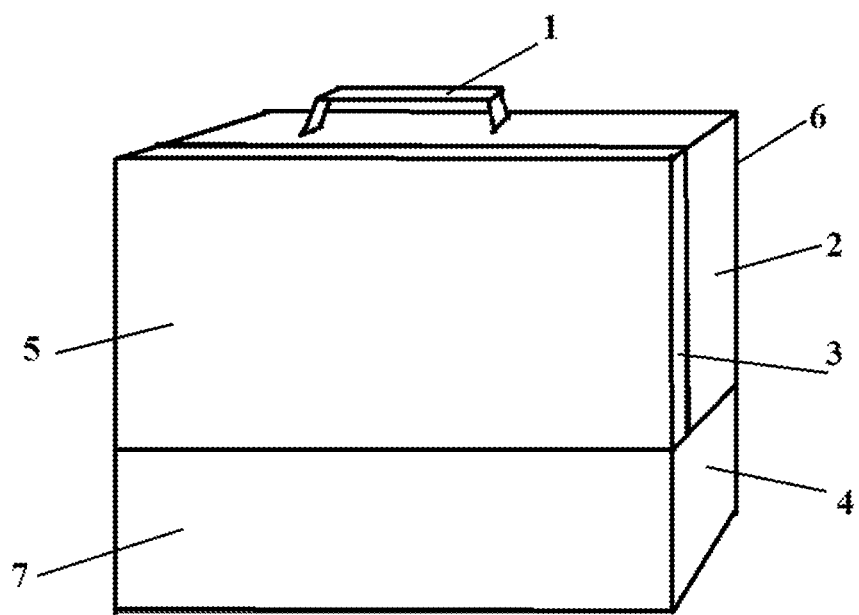
FIG. 1 is the front perspective exterior outline view of the present invention of portable briefcase office with handle extended and all units covered.

In the present invention, a convenient portable briefcase office is designed for outdoor service employees to allow successful documentation and paperwork processing. It contains a computer unit, a supplies and devices unit, and a storage unit, which are covered by opaque or transparent covers. It appears to be a briefcase, but it functions as a movable office. In the preferred embodiment of the portable office in the present invention, the portable office in FIG. 1 illustrates an outline of three main units. The storage unit 2 and computer unit 3 are both attached parallel to each other and above the supplies and devices unit 4. In computer unit 3, the display screen is covered by the lid 5 to protect the screen during transportation. The lid 5 can either be made of opaque or transparent materials. With transparent materials, the lid 5 will be attached to the front of the screen or fixed to the main body; it does not need to be taken off for the computer unit 3 to operate. If the lid 5 is opaque, it can either be taken off entirely or rolled away by a rail. The storage unit 2 is enclosed by the cover 6, and can be used to store necessary documents and items. The handle 1, is attached on top of the storage unit 2, and allows the entire office to be lifted by it. The handle 1, may be retractable depending on the design. The supplies and devices unit 4 is covered and hidden by the lid 7, and supplies all necessary office tools for an employee's task completion. It contains a printer, projector, disk drive, hole puncher, stapler, battery, and other devices compacted into this unit.

Figure 2:
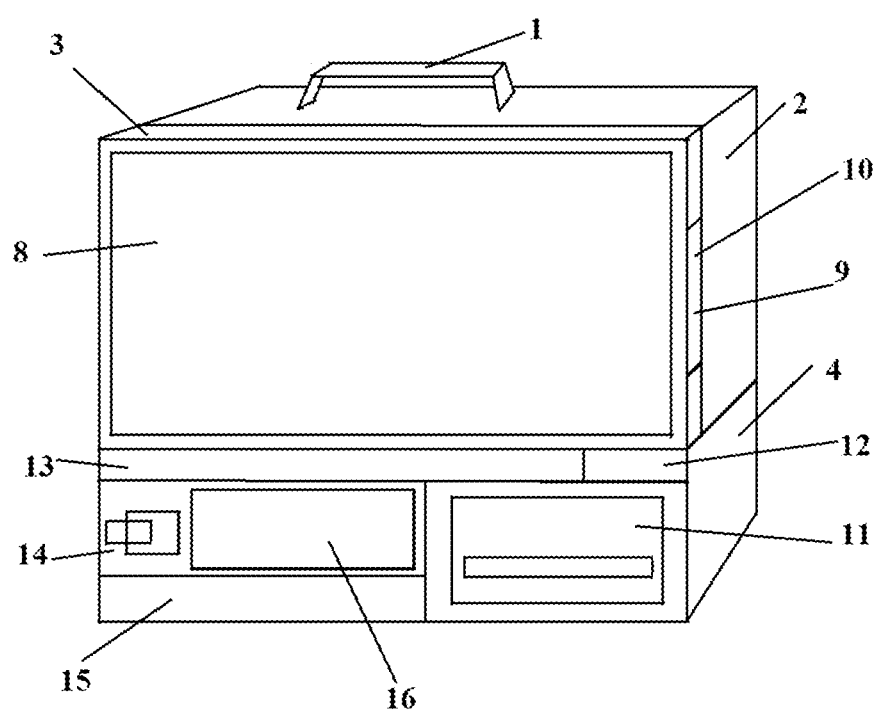
FIG. 2 is the front perspective view of the portable office showing the screen, printer, optical drive, projector, battery, and other components when the lid is taken off.

FIG. 2 displays a front perspective view of the present invention where lids 5 and 7 in FIG. 1 are removed or transparent. The display screen 8 of the computer unit 3 is parallel to the storage unit 2 and on top of the supplies and devices unit 4. The display screen 8 is made by LCD or Organic Compound materials, and faces out of the briefcase. It is angle adjustable or fixed with the body according to different embodiments. The external connection ports 9 of the computer unit 3 are hidden under the cover 10 to prevent small objects or dirt particles to enter in the ports. The ports 9 may, in the preferred embodiment, include USB, VGA, memory stick slot, internet port, microphone, audio, and other output ports for external instrument connection. In the supplies and devices unit 4, printer 11 is at one side and located under the stapler 12 and hole puncher 13. The stapler 12 and hole puncher 13 can be mechanical or automatic, using power from the battery 15. It is extremely useful to organize the documents right after printing or copying from the printer 11. The compact projector 14 is on top of the battery 15, and under the hole puncher 13. The projector 14 is fixed or angle adjustable facing outside through an opening, and is used for presentations or video display. The optical drive 16, is between the printer 11 and projector 14, and on top of the battery 15. The optical drive 16 is used for reading and burning all types of compact disks, eliminating compatibility issues. Battery 15 is power source of the portable briefcase office, and supplies power for all electrical devices in the briefcase.

Figure 3:
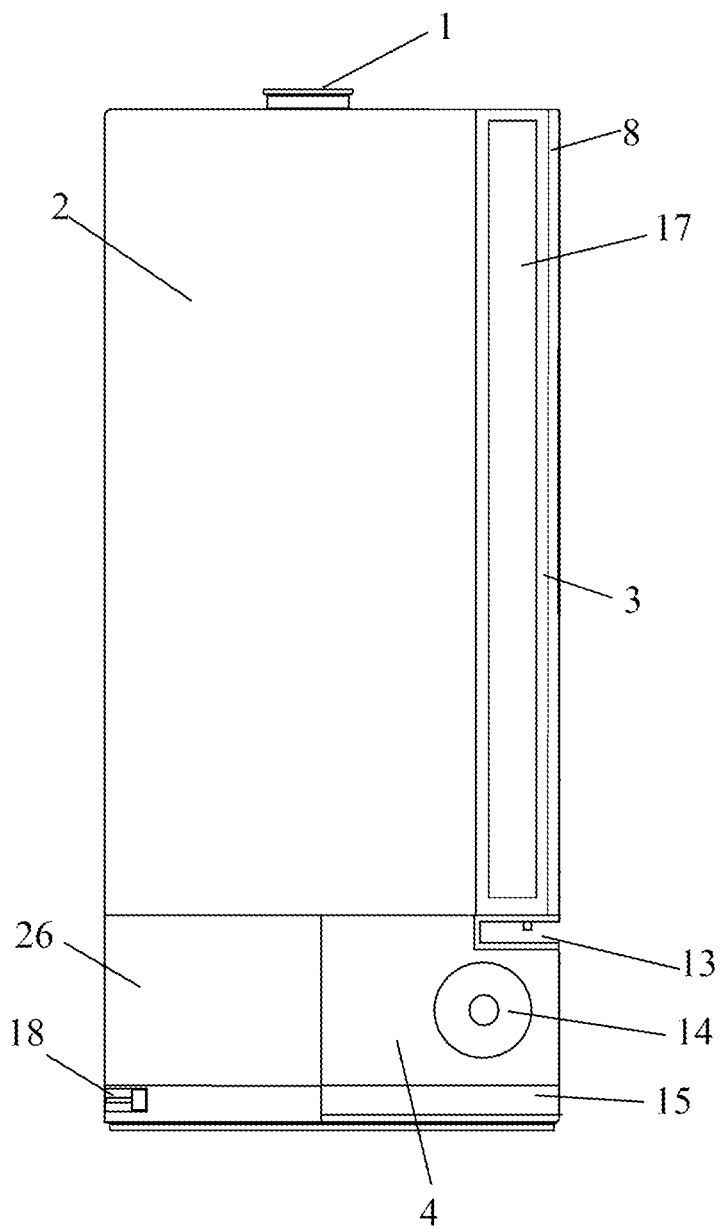
FIG. 3 is the side cross-sectional view of the portable office showing keyboard slot located at the computer unit behind the display screen, and the projector in the supplies and devices unit.

FIG. 3 is a side view of the portable office. The keyboard slot 17 in the computer unit 3 behind the display screen 8 is on top of the hole puncher 13, and is used to store the removable keyboard and trackpad. The projector 14 projects light through the opening shown in the supplies and devices unit 4, and is used either upright or on its side based on form of table and distance if the wall in an auditorium; it is fixed or angle adjustable. If the projector does not achieve the desired angle after internal adjustment, an external item can be placed below the entire portable office until the projector projects on the preferred location. The power inlet 18 provides electricity to all electronics in the portable office with or without the battery 15 charging and operating simultaneously. The supplies and devices unit 4 contains an optional empty space 26 to add or extend the use and functionality of devices in the unit.

Figure 4:
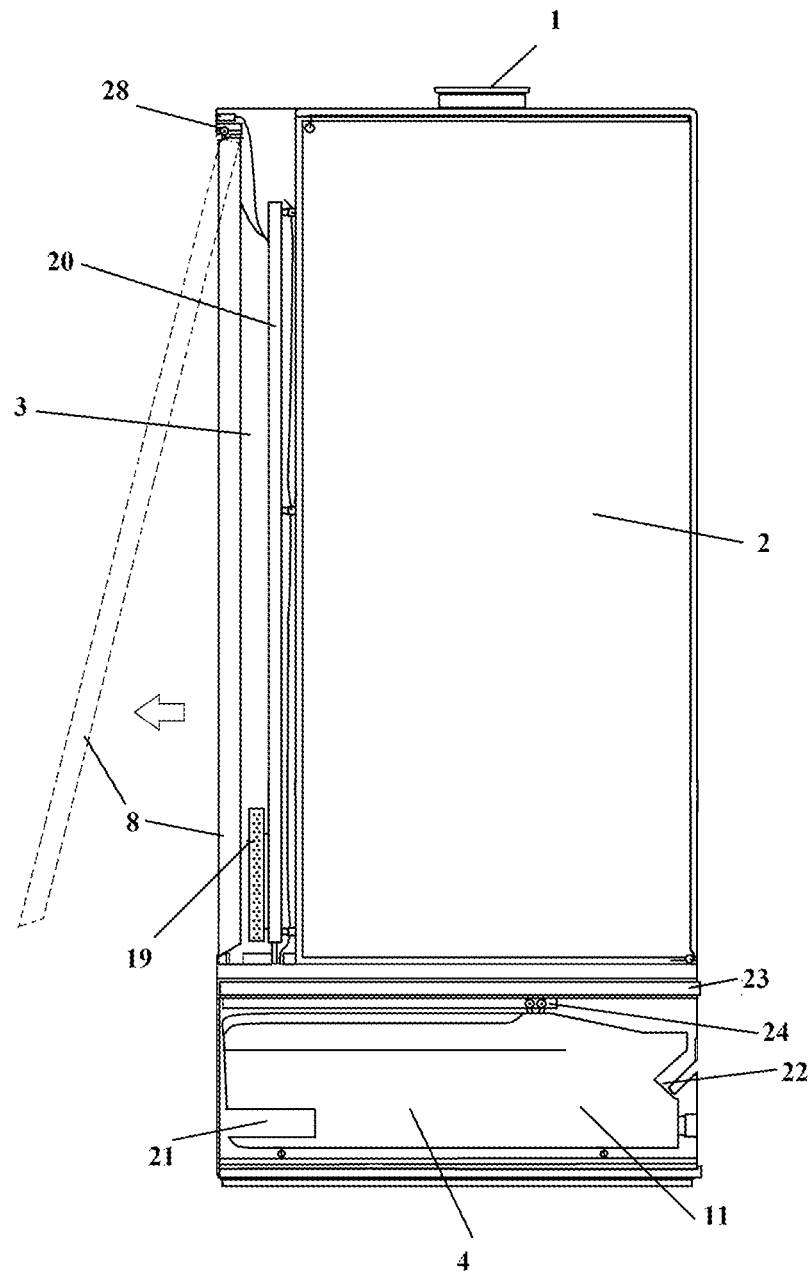
FIG. 4 is another side of the previous side, and is a cross-sectional view of the portable office displaying a printer in the supplies and device unit, an storage unit, and a computer unit with covers removed.

FIG. 4 shows another side of the previous side, and is a cross-sectional view of the portable office, showing the display screen 8 without the cover 5. To prevent confusion, the cover 5 is not shown in this figure but can be referred to in FIG. 1. Unlike a normal laptop computer, the display screen in this embodiment is facing outside of the computer unit attached at the edge of the briefcase, and is adjustable by angle from the bottom of the display by the hinge 28 on top to provide the best angle of view to the operator. The display screen can either be made of LCD or organic compound material. If the cover of the display screen 5 is opaque, the display screen 8 can be used by removing the cover 5. If the cover is transparent, the transparent cover will not be needed to removed to view the display screen 8; it can be attached together with the display and used as a display screen protector. Depending on the need for ruggedness, shock-absorbing mechanisms can be placed between the screen and the transparent cover to prevent the screen from damage during transportation. A computer control board 20 controls the actions of all electronic devices in the portable office, and is located in the computer unit, attached in between the display screen 8 and the storage unit 2. The computer control board 20 and the entire supplies and devices unit 4 may also have shock absorbing mechanisms attached from it to the main body of the briefcase for durability. Speakers 19 behind the display screen 8 are connected and attached to the computer board 20. The size and power of the speakers 8 can be modified to the needs of the specific task. The printer 11 in the supplies and devices unit 4 takes in paper from the paper feeder 22, and when printer task is finished, paper rolls out through the opening 21. The paper holder 23 is physically removed from the supplies and devices unit 3 and placed into the opening under the paper feeder 22. This will create an incline for paper to be fed into the paper feeder 22. The printer is attached to a rail 24, which allows the printer to be pulled out from the supplies and devices unit 4 for maintenance. The printer 11, also serves as a scanner, fax, and copy machine by inserting paper the same way as one would when printing.

Figure 5:
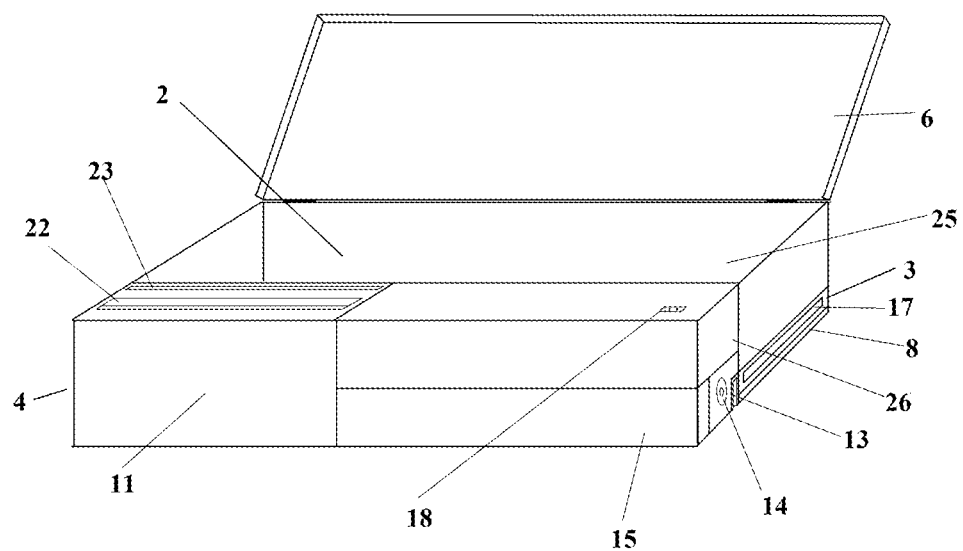
FIG. 5 is the rear perspective view of the portable office placed flat with the storage unit open.

FIG. 5 is the rear perspective view of the portable office placed flat with the storage unit 2 open. The storage area 25 of the storage unit 2 can be used to store small office supplies such as staple remover, writing utensils, rulers, disks, and documents. The storage unit 2 and cover 6, can both be seen as a portion of the backside of the briefcase. The cover of the storage unit 6 can be opened and closed in various ways such as a hinge at an edge of the storage unit 2 or a hinge between the supplies and devices unit and storage unit; all ways of opening will serve the purpose of enclosing the storage unit 2. The supply and device unit 4 is shown in front of the storage unit 2 and contains printer 11, battery 15, projector 14, hole puncher 13, AC inlet 18 and an empty space 26 for optional devices. The empty space 26 allows extra devices such a fan, amplifier, AC outlet, label printer, or any interested devices to be integrated in the briefcase, depending on the specific product. If the space is not used, devices installed in front, such as battery, projector, and optical drive, can be expanded in size for more power and functionality. The computer display screen 8 and keyboard slot 17 in the computer unit 3 is displayed under the storage unit 2.

Figure 6:
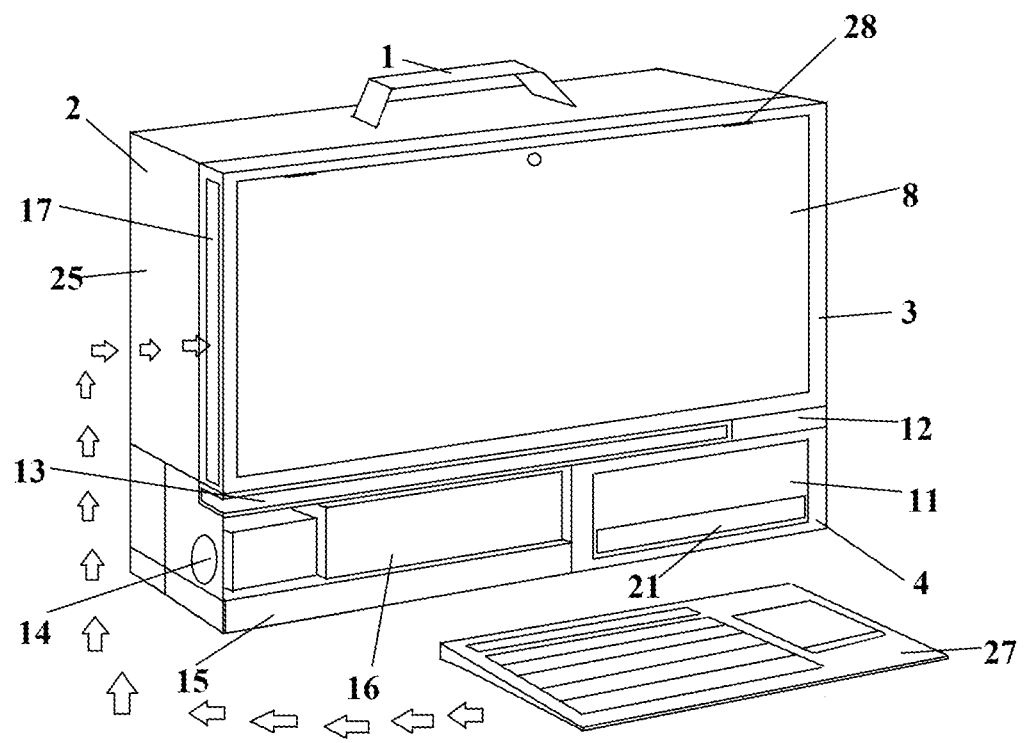
FIG. 6 is the front perspective view of the present invention of portable office with handle extended and keyboard placed in front of the portable office.

FIG. 6 is the front perspective view of the present invention of portable office with keyboard and trackpad 27 placed in front of the portable office for normal operation. The removable keyboard 27 allows more distance between the user and the portable office, which can be taken advantaged of during presentations, printing documents, and overall ease of use. The higher upright display screen 8 and the ability to be changed by angle via the hinge 28, reduces strains in the neck to create a suitable posture comparable to a desktop computer in the operation. When documents are prepared by the computer unit 3 to print, paper will go out from the printer 11 through the opening 21. After printing, the documents can be instantly stapled by stapler 12 placed directly on top of the printer 11, or scanned directly to the computer by placing the printed sheets back into the paper feeder 22. If desired, the documents can be sent by fax from the scanned documents. Hole puncher 13 can punch holes to the paper. Documents can then be placed into the storage area 25 located in the storage unit 2. When the keyboard and trackpad 27 is no longer needed, it can be placed back into the slot 17 and the briefcase can be carried away. The keyboard and trackpad 27 is either wireless or wired, and if wireless, it will contain either a rechargeable internal battery or an external removable battery. If the battery is internal, the battery is automatically charged when the keyboard and trackpad 27 is stored into the slot 17. When an optical disk drive 16 is needed for operation, such as watching videos or using software from a disk, it can be easily accessed next to the printer 11.

Figure 7:
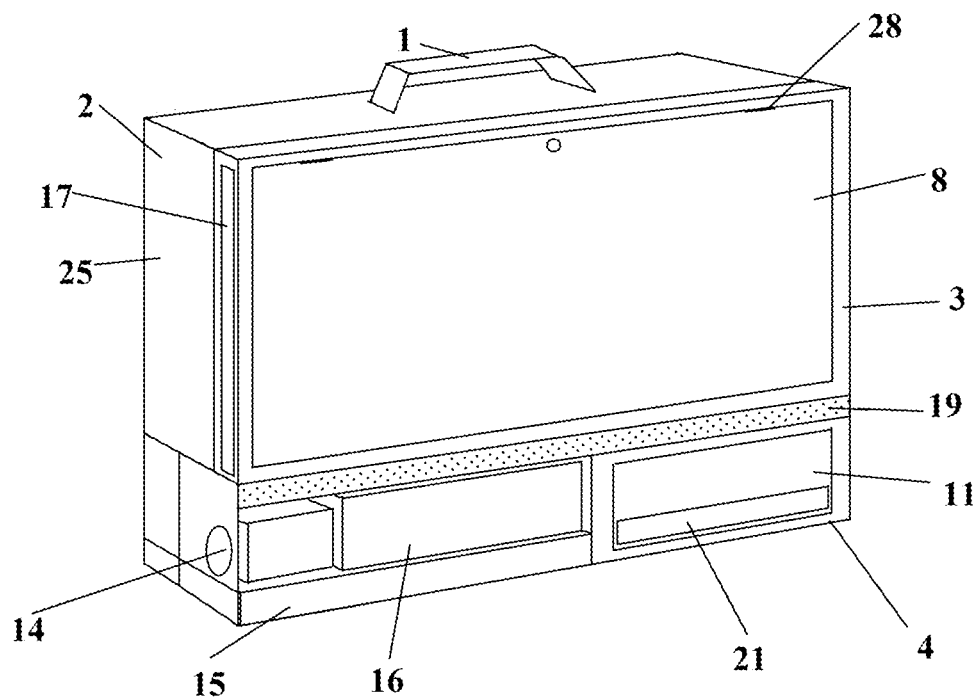
FIG. 7 is the front perspective view of another embodiment of the portable office.

FIG. 7 is another embodiment of the current invention of the portable office briefcase, wherein hole puncher 13 and stapler 12 are replaced by a powerful speaker 19. When presentations are needed when using the projector or display screen, an external microphone can be used with the speaker 19 that will have an amplifier connected to it inside, creating a loudspeaker for live reports. In practical design, the portable office briefcase can be made into different models and series; components within the units are all or partially selected depending on its necessity of various occupations.

Figure 8:
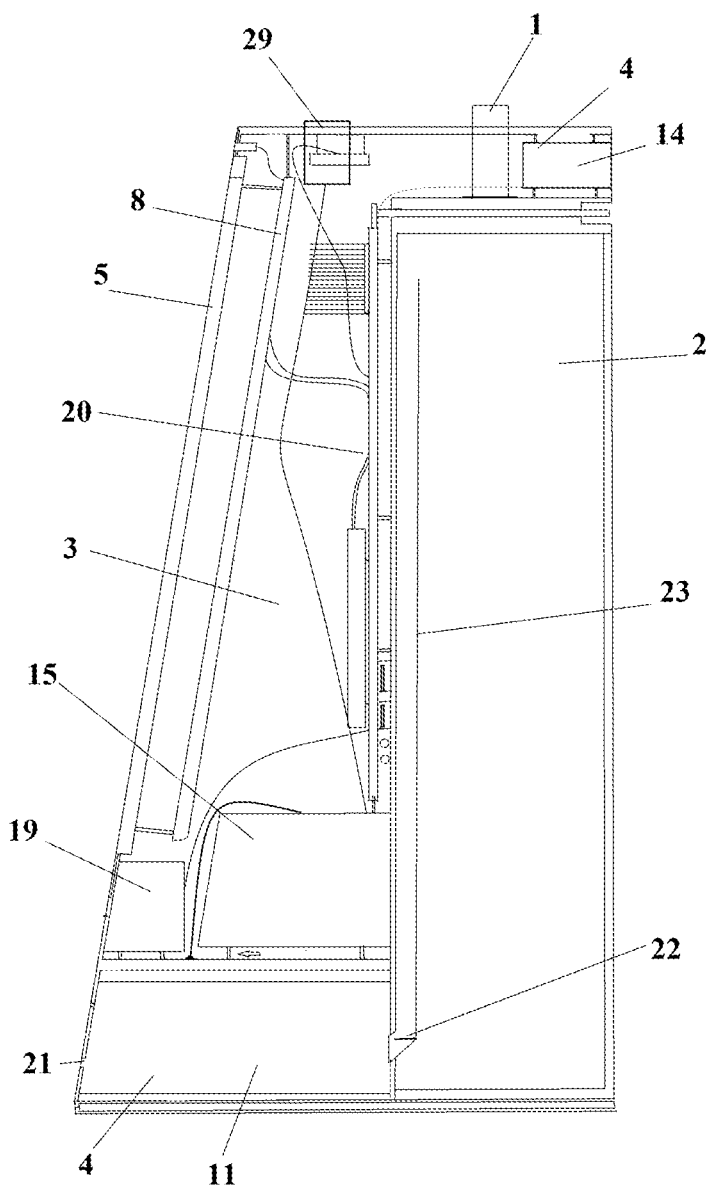
FIG. 8 is side cross-sectional view of the third embodiment of the portable office.

FIG. 8 is a side cross-sectional view of the third embodiment of the portable briefcase office, where components are arranged in a different style. Storage unit 2 in this embodiment, is at the back of the computer unit 3 and supplies and devices unit 4. There is a portion of interlock between computer unit 3 and supplies and devices units 4 at the top of the briefcase, as the projector 14 is placed on top of the storage unit 2 next to the handle 1. This causes the supplies and devices unit 4 to be separated into two sections. The computer unit 3 contains a fixed angle display screen 8 attached to a fixed transparent cover 5 made by tempered glass, impact resistant plastic, or other transparent material. This is more convenient for computer operation as it does not require the user to take off the lid 5 during use. In this embodiment, computer control board 20 and other components in the computer unit can be enlarged as that of a desktop computer, while also creating more possibility for a passively cooled system without air vents. With fixed screen and passive cooling, the entire portable office briefcase can be made waterproof. The impact absorbers can also be used to prevent the possibility of damage to components during transportation. In this design, the printer 11 occupies half of the bottom portion, which allows more storage in the storage unit 2. The difference of this embodiment compared to previous designs is the printer 11 has paper fed by paper feeder 22 from inside of the storage unit 2. Paper can be stored inside in the fixed paper holder 23 prior to printing, reducing hassle compared to one that is pulled-out. Large speakers 19 are attached between the display screen 8 and the printer 11 to create a more high-quality sound. All electrical devices are powered by the battery 15, which is placed internally between the display screen 8 and storage unit 2.

Where there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention of the portable office briefcase is subject to modification with regard to the dimensional relationships set forth herein and modifications in assembly, materials, size, shape, and use. For instance, there are numerous components described herein that can be replaced with equivalent functioning components to accomplish the objectives of the present invention. One modification is the use of different body materials than those set forth herein.

What is claimed is:

1. A portable briefcase office, compromising:
    a computer unit attached at one side to a storage unit, a supplies and devices unit on the bottom of both storage and computer units, all units separated or interlocked into a briefcase like casing;
    the computer unit consists of a display screen made of LCD or organic compound material faced out of the briefcase, angle adjustable or fixed with the body, a keyboard with included trackpad that controls all components of the briefcase, taken out from a slot during normal computer operation, and placed back into the slot when not in use; a computer board, speakers, camera, microphone, remote control, and external connection ports arranged in the unit;
    a storage unit composing of a lid enclosing the storage area;
    a supplies and devices unit consisting of a printer that also serves as a scanner and fax machine controlled by the computer control board and powered by a battery which supplies electricity to all electrical components in the briefcase; a projector, hole puncher, stapler, electrical inlet port, and optical drive is also arranged in this unit.

2. The portable office, according to claim 1, wherein said components within the units are all or partially selected depending on its specific use, and is designed in a series of products for the necessity of various occupations.

3. The portable office, according to claim 1, wherein said location of units and devices differ or interlocks in area occupied depending on various devices chosen and the design.

4. The portable office, according to claim 1, wherein said computer unit contains a compact computer screen and control board similar to one in an ultraportable laptop computer system, so more space can be utilized for other devices.

5. The portable office, according to claim 1, wherein said display screen in the computer unit will contain a cover, either fixed transparent, opaque removable or retractable.

6. The portable office, according to claim 1, wherein said speakers are attached either directly onto the computer unit or independently detached for enhanced audio quality.

7. The portable office, according to claim 1, wherein speaker can be used with the microphone and amplifier to create a loudspeaker for presentations.

8. The portable office, according to claim 1, wherein said keyboard and trackpad is detached from the computer unit and used either wirelessly or by cable connection, and if wireless, the keyboard's internal battery is either recharged in the keyboard slot of the computer unit, or used with non-rechargeable replaceable batteries.

9. The portable office, according to claim 1, wherein said the shape or location of the storage unit is dependent on the specific design and devices chosen in other units.

10. The portable office, according to claim 1, wherein said printer in the supplies and devices unit either feed paper in by the exterior or interior of the portable office according to the specific design.

11. The portable office, according to claim 1, wherein said printer is pulled out for ink or toner maintenance.

12. The portable office, according to claim 1, wherein said fixed or angle adjustable projector in the supplies and devices unit will project light through an opening be used either upright or on its side.

13. The portable office, according to claim 1, wherein said supplies and devices unit will have a space either for optional devices to integrate, or to extend the functionality of existing devices.

\* \* \* \* \*